United States Patent [19]
Giani

[11] Patent Number: 5,803,597
[45] Date of Patent: Sep. 8, 1998

[54] MACHINE FOR THE EXTRUSION OF POLYMERS AND THE LIKE WITH CONVERGING THREADED ROTORS EACH ACTUATED BY MEANS OF ITS OWN ACTUATING MOTOR

[75] Inventor: Mauro Matteo Giani, Guanzate, Italy

[73] Assignee: Pomini S.p.A., Castellanza, Italy

[21] Appl. No.: 741,382

[22] Filed: Oct. 29, 1996

[30] Foreign Application Priority Data

Nov. 21, 1995 [IT] Italy ............................. MI95 A 02416

[51] Int. Cl.⁶ .................... B29B 7/22; B01F 7/08
[52] U.S. Cl. .................. 366/83; 366/100; 74/655 L; 425/204
[58] Field of Search ............. 366/83, 89, 97, 366/292, 297, 298, 300, 301, 318; 425/204, 208, 209; 74/655 H, 665 L, 665 M, 665 N

[56] References Cited

U.S. PATENT DOCUMENTS

| | | | |
|---|---|---|---|
| 3,132,739 | 5/1964 | Jakobsson et al. | 366/318 |
| 3,325,864 | 6/1967 | Kohyama et al. | 366/83 |
| 3,824,875 | 7/1974 | Willert et al. | |
| 4,311,472 | 1/1982 | Hiersig et al. | 74/665 L |
| 4,437,046 | 3/1984 | Faillace . | |
| 4,527,899 | 7/1985 | Blach et al. | 366/79 |
| 4,682,510 | 7/1987 | De Bernardi | 74/87 |
| 4,773,763 | 9/1988 | Weber | 366/83 |
| 4,796,487 | 1/1989 | De Bernardi | 74/665 |
| 5,415,473 | 5/1995 | Nakano et al. | 74/665 H |

FOREIGN PATENT DOCUMENTS

| | | |
|---|---|---|
| 0 119 324 | 12/1983 | European Pat. Off. . |
| 0 166 008 | 6/1984 | European Pat. Off. . |
| 0 598 376 | 11/1993 | European Pat. Off. . |
| 879861 | 4/1953 | Germany ............... 425/204 |
| 969063 | 4/1958 | Germany ............... 366/297 |
| 1 778 369 | 4/1968 | Germany . |
| 840116276 | 6/1984 | Japan . |

*Primary Examiner*—Tony G. Soohoo
*Attorney, Agent, or Firm*—Herbert Dubno; Yuri Kateshov

[57] ABSTRACT

Machine for the extrusion of polymers and the like, comprising a pair of threaded rotors (5) with axes which are generally converging with respect to each other and means (7) for synchronized transmission of the movement to the said rotors (5), wherein each rotor (5) is made to rotate by means of its own actuating motor (8).

7 Claims, 2 Drawing Sheets

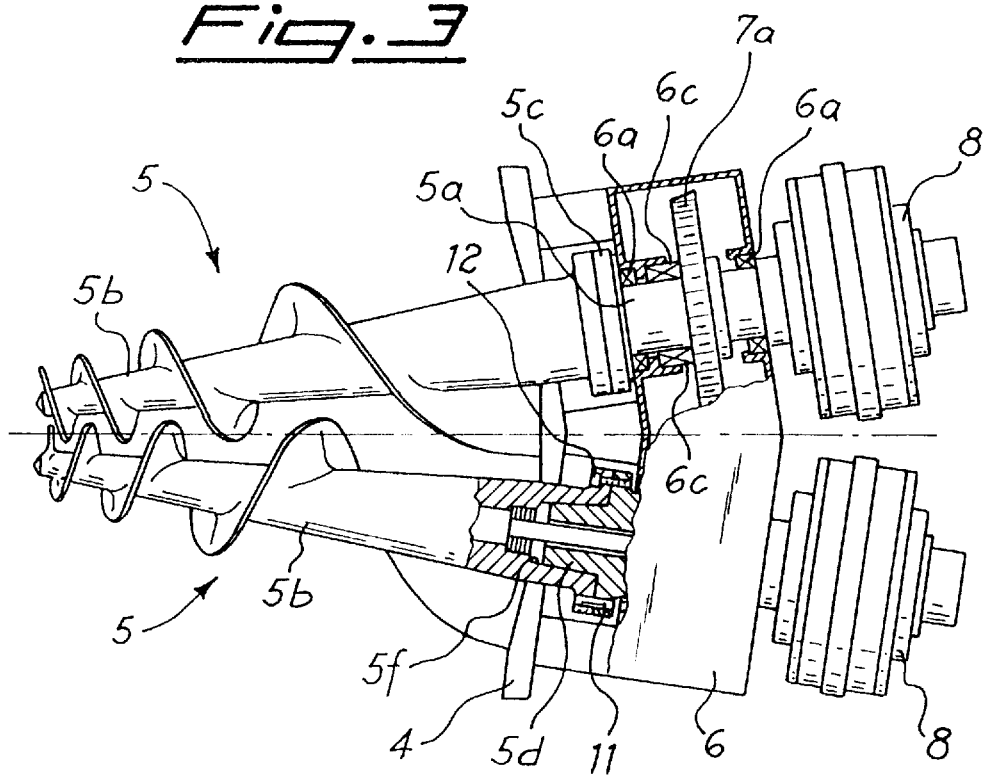

MACHINE FOR THE EXTRUSION OF POLYMERS AND THE LIKE WITH CONVERGING THREADED ROTORS EACH ACTUATED BY MEANS OF ITS OWN ACTUATING MOTOR

FIELD OF THE INVENTION

The present invention relates to a machine for the extrusion of polymers and which is formed with two threaded and converging rotors.

BACKGROUND OF THE INVENTION

In the technical sector of elastomer and plastomer processing it is known to use conical twin-screw extruder machines in which two threaded shafts or rotors, are arranged with converging axes inside a containment casing.

It is also known that rotors must rotate at a low number of revolutions and in a synchronized manner with respect to one another so as to maintain the angular phase difference which is predefined during assembly of the machine in such a manner as to avoid interference between the threading of the two rotors. Such interference would prevent rotation of the rotors particularly in the case of rotors of the interpenetrating type.

It is also known from the publications EP 0,472,431 and EP 0,598,376 of devices for actuating the rotors based on either transmissions of the endless-screw type, helical wheel and bevel gears for direct transmission of the movement and the synchronism between the low-speed shafts, or transmissions with a reducer associated with each rotor and conical drives for transmission of the movement and the synchronism via the high-speed shafts.

The extruders known in art, therefore, have a single source of movement usually consisting of an electric motor, the output shaft of which is connected by means of suitable transmission devices to the two rotors for the rotational actuation thereof.

This configuration, although providing a single source of movement, nevertheless requires the use of devices for reducing the speed of rotation, associated with each rotor, as well as devices for synchronized transmission of the movement, arranged between the high-speed shaft of the motor and the high-speed shaft of the reducer.

This, in turn, requires a structure supporting and containing the transmission devices having large dimensions and considerable structural complexity. As a result known apparatuses are difficult to maintain.

In addition a great number of devices forming the movement transmission system results in malfunctions affecting the machine as a whole.

OBJECTS OF THE INVENTION

It is therefore a principle object to provide a machine for the extrusion of polymers with two threaded and converging rotors which has a simplified structure.

Still another object is to provide means for synchronized actuation of the rotors to reduce the component parts for transmission of the movement and reduction in the speed.

Yet another object is to provide a structure which can be easily accessible for maintenance operations.

SUMMARY OF THE INVENTION

These results are obtained by the present invention which provides a machine for the extrusion of polymers and the like, comprising a pair of threaded rotors with axes generally converging with respect to one another and means for synchronized transmission of the movement between the said rotors, wherein each rotor is made to rotate by means of its own actuating motor.

According to a preferred embodiment, the motors for actuating the rotors are of the hydraulic type.

BRIEF DESCRIPTION OF THE DRAWING

The above and other objects, features, and advantages will become more readily apparent from the following description, reference being made to the accompanying drawing in which:

FIG. 3 is a plan view of the extruder partially sectioned in the zone where the two parts forming the rotors are joined together.

SPECIFIC DESCRIPTION

Figure 1:
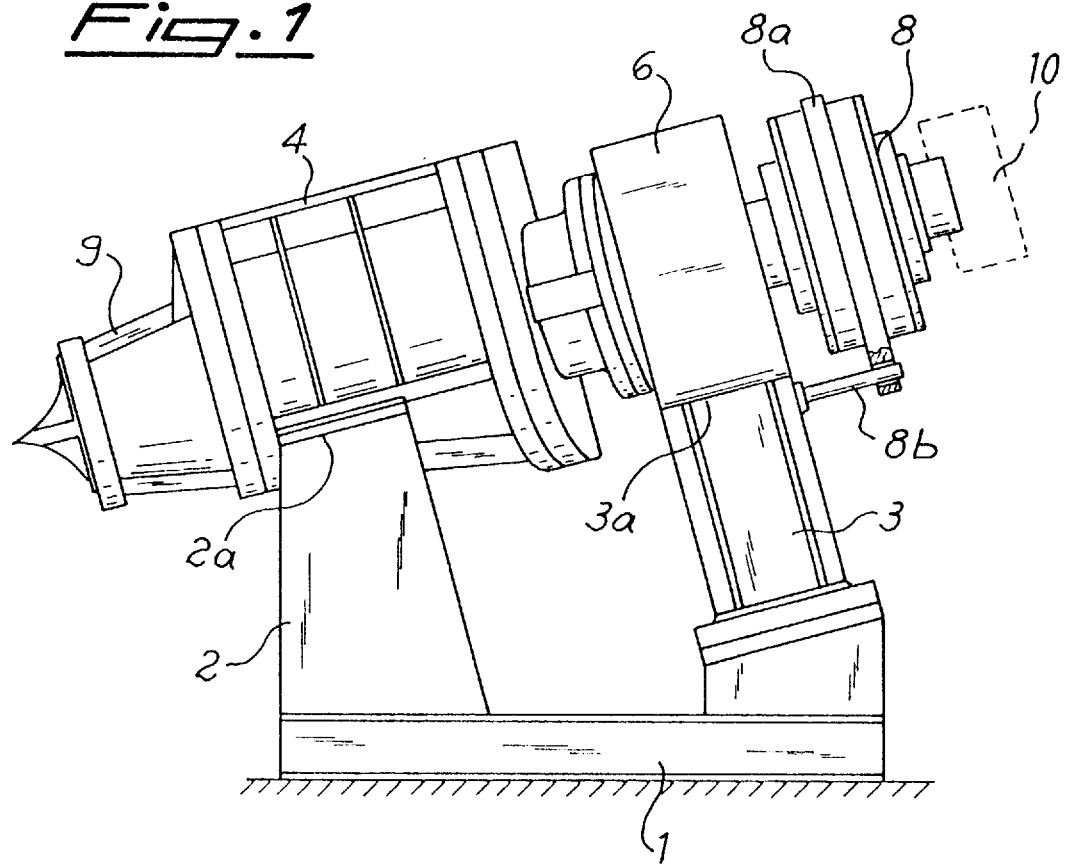
FIG. 1 is a side elevational view of an extruder according to the invention.

As shown in FIG. 1, the extruder according to the invention comprises a base 1 having arranged on it uprights 2 and 3, the respective upper surfaces 2a and 3a of which are parallel with one another and inclined towards the front part of the machine by a suitable angle.

The front uprights 2 support the housing 4 containing the rotors 5, while the rear uprights 3 support a housing 6 containing means 7 for transmission of the movement, associated with each rotor 5. The entire arrangement of the above-described parts which make up the extruder is realized so as to give rise to an angle of convergency of the axes of the two rotors 5 and a downwards inclination of the entire mixing part 4 and extruding part 9 of the machine, corresponding to the front part of the machine itself so as to avoid stagnation of the material during processing.

According to a preferred embodiment and as illustrated more clearly in FIG. 3, the rotors 5 are formed in two separate parts consisting of a shaft 5a for receiving the driving movement and a threaded part 5b, with variable-pitch threading, fixed to the shaft 5a as described in more detail below.

The shaft 5a is supported at the rear by associated radial bearings 6a and by a thrust bearing 6c seated in the housing 6.

The shaft 5a has a front flange 5c with, emerging from it, a conical journal 5d for coupling with a corresponding conical seat 5f formed in the threaded part 5b of the rotor 5, so that insertion of the latter onto the shaft is performed with a self-centering action and with friction which contributes to transmission of the movement.

The angular positioning and locking of the threaded part 5b to the shaft 5a is performed by means of pins 11 and screws 12 arranged between respective front-abutting flanges of the parts 5a, 5b of the rotor 5 to be joined.

As can be seen from the figures, each rotor 5 is made to rotate by its own motor 8 coaxially and directly mounted on the associated drive shaft 5a.

In the example illustrated the motors 8 are of the hydraulic type with a hollow shaft, known per se and therefore not described in detail. The hydraulic motor 8 has a coaxial flange 8a which extends downwards and which is constrained at its bottom end to the free end of a pin 8b, the other end of which is fixed to the upright 3.

The flange 8a and stop 8b form overall anti-rotation means of the motor 8 which without said constraining means could not cause rotation of the rotors 5.

Said pin/flange connection may also be realized by means of the intermediate arrangement of an articulation for recovery of any flexing of the rotor due to the loads to which it is subject.

Although the preferred embodiment of the extruder according to the invention envisages the use of hydraulic motors coaxial with the rotors, it is obvious, however, that motors of another type may also be applicable, such as for example electric motors which in this case will be connected to the rotors by means of suitable transmission devices.

Figure 2:
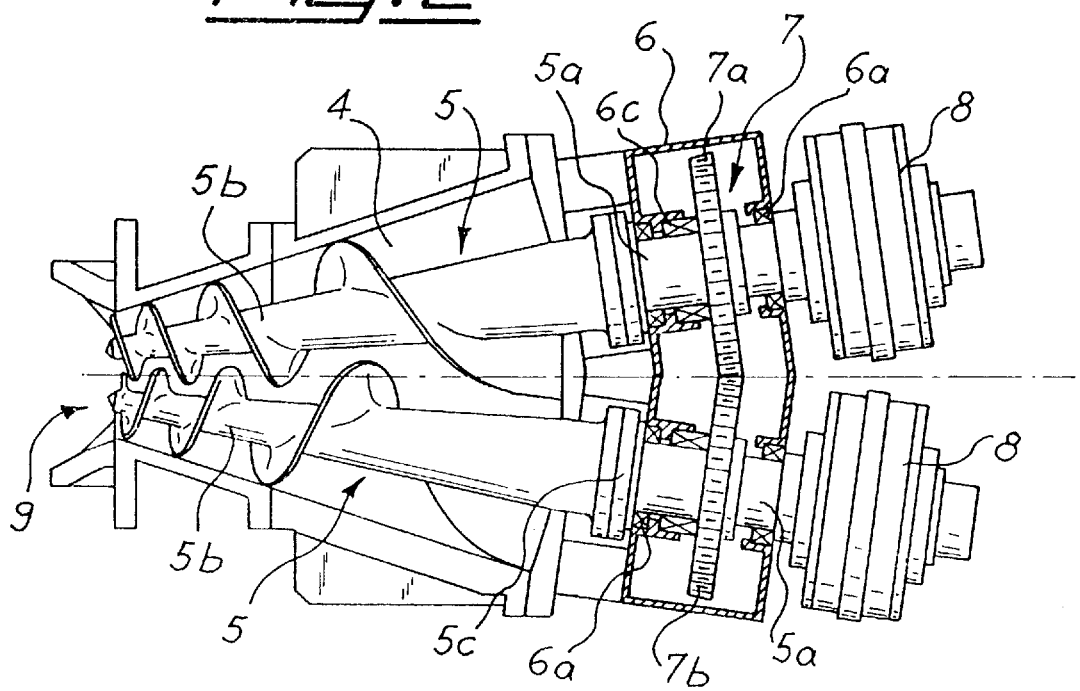
FIG. 2 is a plan view of the extruder partially open in the region of the rotors.

As can be seen from FIG. 2, each shaft 5a has mounted on it a respective toothed wheel 7a, 7b radially meshed with the other one so as to form a bevel gearing 7. In a preferred embodiment this gearing consists of gears of the so-called "FACE" type which are simpler to realize.

By means of the gearing the simultaneous result of synchronization and a safety check as to correct operation of the two motors 8 is achieved. If, in fact, one of the two motors jam, the corresponding stopped toothed wheel 7a, 7b is able to stop and keep the other toothed wheel 7b, 7a blocked, preventing impact between the two threaded parts 5b of the rotors 5 which, no longer rotating in a synchronized manner, would not maintain the initial angular difference and would make contact.

As shown in FIG. 1 in broken lines, the motor shaft may also be provided with a device 10, for example of the type known by the name "encoder", for checking the angular position of the associated rotor 5, i.e. since, if one of the two toothed wheels of the gearing should be damaged, for example losing a tooth, there would be a variation in the initial angle of phase difference between the two rotors 5 which could again result in damage to the rotors 5.

From the configuration described above it is therefore obvious how the twin-screw extruder according to the invention has a small number of components forming the mechanical transmission, resulting in greater compactness and reliability of the machine, safe operation of which is ensured both by the particular type of bevel gearing for transmission of the movement between the low-speed shafts, and by any devices for checking the angular position of each rotor.

The machine consequently has the characteristic features that it is extremely compact and easy to access and maintain, particularly in the case of rotors consisting of two parts, which allow the threaded part to be replaced without the need for disassembly of the transmission.

Many variations may be introduced as regards the realization of the parts which make up the invention, without thereby departing from the protective scope of the present invention as defined by the claims which follow.

What is claimed is:

1. An extruder comprising:

a pair of elongated rotors extending along respective longitudinal axes, said axes converging toward each other, each of said pair of rotors comprising:

a respective rotor shaft having opposite ends and rotatable about a respective one of the longitudinal axes, and a respective extruder screw extending axially from one end of the rotor shaft and rotatably fixed therewith;

first and second motors each driving a respective one of said rotors and mounted coaxially and directly on the respective other end of the rotor shaft of the respective rotor; and gear means for synchronizing rotation of said rotors upon actuating each of said rotor shafts by the respective motor and including two gears dimensioned to synchronize said rotors but insufficient to drive said rotors without respective motors, each of the gears being rotatably fixed on the respective shaft and meshing with the other gear.

2. The extruder defined in claim 1 wherein each of said motors is a hydraulic motor.

3. The extruder defined in claim 1 wherein each of said motors is provided with respective stop means for preventing rotation of a casing of the motor.

4. The extruder defined in claim 1 wherein said gears is a bevel gearing.

5. The extruder defined in claim 1 wherein said gears is a FACE type gearing.

6. The extruder defined in claim 1 wherein each of the rotors is further formed with:

respective centering means for centering the respective extruder screw on the respective one end of the rotor shaft, respective angular positioning means for positioning the extruder screw on the rotor shaft; and respective locking means for locking the extruder screw on the rotor shaft upon positioning.

7. The extruder defined in claim 1, further comprising means for checking an angular position of each of said rotors.

* * * * *